Patented May 16, 1972 3,663,309
Fig. 1
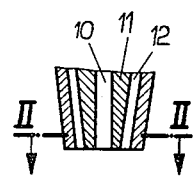
Fig. 3
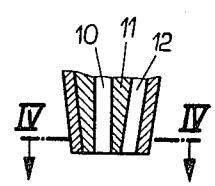
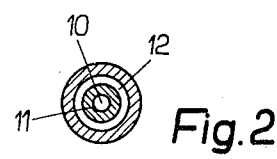
Fig. 2
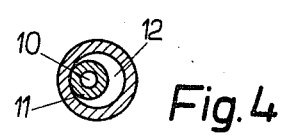
Fig. 4
Fig. 5
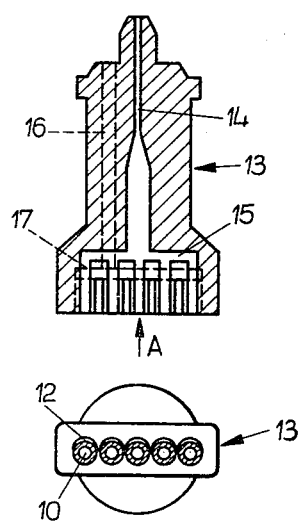
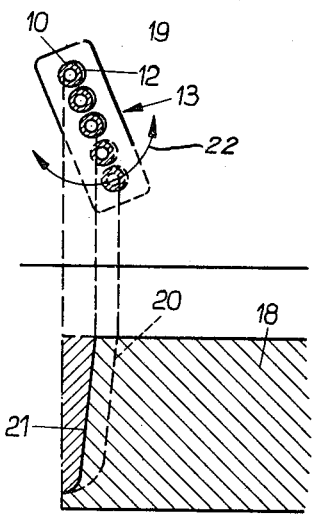
Fig. 6
Fig. 7

United States Patent
Lange

[15] 3,663,309
[45] May 16, 1972

[54] FLAME CUTTING METHOD
[72] Inventor: Gerhard Lange, Frankfurt am Main, Germany
[73] Assignee: Messer Griesheim GmbH, Frankfurt am Main, Germany
[22] Filed: Sept. 22, 1970
[21] Appl. No.: 74,365

Related U.S. Application Data

[63] Continuation of Ser. No. 765,260, Oct. 4, 1968, abandoned.

[30] Foreign Application Priority Data

Oct. 5, 1967 Germany....................P 16 29 959.5

[52] U.S. Cl..............................................148/9
[51] Int. Cl...........................................B23k 7/00
[58] Field of Search......................................148/9

[56] References Cited

UNITED STATES PATENTS 2,491,024  12/1949  Babcock....................................148/9
1,604,890  10/1926  Eastman et al. ..........................148/9

Primary Examiner—L. Dewayne Rutledge
Assistant Examiner—W. W. Stallard
Attorney—Connolly and Hutz

[57] ABSTRACT

A flame cutting torch cuts tulip shaped edges of certain depth with the cutting pressure being adjusted to the cutting depth and reduced by more than 50 percent and with the torch nozzle heated unilaterally at the side disposed toward the work piece.

7 Claims, 7 Drawing Figures

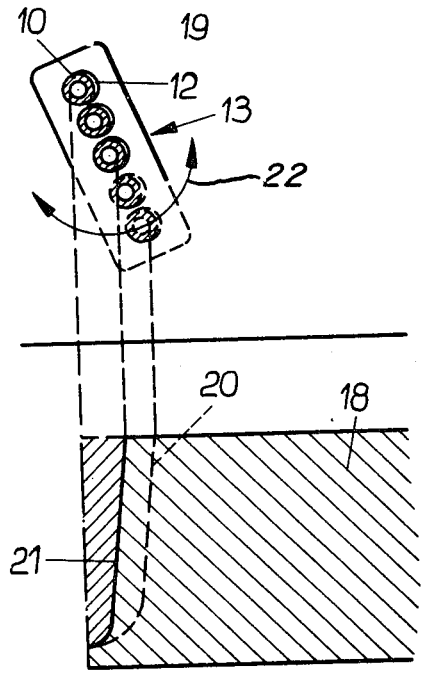

FLAME CUTTING METHOD

CROSS-REFERENCE TO RELATED APPLICATION

This application is a continuation of copending application Ser. No. 765,260, filed Oct. 4, 1968 and now abandoned.

BACKGROUND OF INVENTION

The invention relates to a method for the flame cutting grooves of certain depth with a cutting oxygen pressure adjusted to the cutting depth and reduced by more than 50 percent, in comparison to the previous cutting oxygen pressures, and preferably by more than 75 percent, as described in my copending application Ser. No. 687,344, filed Dec. 1, 1967 and now abandoned, the disclosure of which is incorporated herein by reference thereto.

SUMMARY OF INVENTION

The object of the invention is further to improve the effect achieved by the process disclosed in the above application. The improvement is characterized in that the torch nozzle is heated unilaterally at the side of the nozzle facing the work piece.

By the inventive unilateral heating the desired deflection of the cutting jet is further intensified, which for example is utilized in the so-called J-cutting of a tulip shaped welding seam preparation. Thereby the number of the required work steps can be considerably decreased up to the finishing of the desired seam shape.

The choice of nozzle may vary with the different needs of one skilled in the art. In maintaining the above stated oxygen pressures, the effect of a deflection of the cutting jet can be achieved with practically any cutting torch nozzle — even if with varying intensity and precision. The heating gas openings facing the work piece in this connection are to be closed by being plugged up for example. Particularly suitable and preferred, however, is a slotted nozzle, which has heating slots only on the side facing the work piece.

A further advantageous embodiment of the invention is characterized by a nozzle with an annular heating canal surrounding the cutting oxygen boring and furthermore in that the cutting oxygen boring is arranged eccentrically to the annular heating canal.

In the use of such nozzles — as experiments have shown — the deflection effect of the cutting jet can be achieved in strongly characteristic form, so that only relatively few work processes or steps are needed, for example for the preparation of a J-cut. A further reduction of work processes, namely to a single work step, can be achieved according to the invention in that in the torch a plurality of nozzles is arranged at an angle, one after the other.

This means a considerable saving in processing time. An essential advantage is that the energy brought into the work piece from the preceding nozzle can be utilized as the case may be by the next nozzle before this energy is conducted through the work piece or is transmitted to the surroundings. It is thereby possible to lower considerably the total energy requirement in the preparation of a certain cut.

According to a further suggestion of the invention, one and the same torch of the above-described type can be used for the preparation of any desired shape of the J-cut in that the torch is swingable about an axis of revolution vertical to the work piece surface.

A similar effect can also be achieved in that the nozzles arranged in series can be switched on and off either individually or in groups.

THE DRAWINGS

FIG. 1 shows an annular nozzle of customary construction in longitudinal cross-section;

FIG. 2 is a section along the line II — II in FIG. 1;

FIG. 3 shows an annular nozzle with a cutting oxygen boring arranged eccentrically, in longitudinal section;

FIG. 4 is a section along the line IV—IV in FIG. 3;

FIG. 5 shows a torch with a plurality of nozzles arranged in series, in longitudinal section;

FIG. 6 is a view of the torch of FIG. 5 in the direction of arrow A; and

FIG. 7 is an example of the torch of FIGS. 5 and 6.

DETAILED DESCRIPTION

In the cutting nozzle of customary construction illustrated in FIGS. 1 and 2, the nozzle body 11 has a central cutting oxygen boring 10 with the annular heating gas canal 12 arranged concentrically thereto.

The design of FIGS. 3 and 4 differs from the design of FIGS. 1 and 2 described above in that the nozzle body 11 and thus also the cutting oxygen boring 10 are arranged eccentrically as compared to heating gas canal 12. As a result a unilateral heating of the work piece is achieved with reference to the cutting oxygen jet.

In the design of FIGS. 5 and 6 here are combined five such nozzles in a common torch 13. Torch 13 has a common cutting oxygen supply conduit 14 which branches out by way of cross connection 14 into individual cutting oxygen borings 10. In a corresponding manner, there is also provided in torch 13 a common heating gas conduit 16, which is indicated by dotted lines in FIG. 5. The heating gas conduit 16 empties into a cross connection 17, also shown by dotted lines, from where the heating gas then reaches into the individual annular canals 12.

In the example shown in FIG. 7, torch 13, described above, serves for the preparation of a J-shaped cut. The unilaterally acting heating gas canals 12 are facing the work piece 18, which in the bottom part of FIG. 7 is shown in cross-section for the sake of a general view. An arrow 19 marks the advance direction of the torch. As seen in the upper part of FIG. 7, the torch nozzles with reference to the advance direction 19 are arranged at an incline one after the other. The eventual cutting shape, sketched by a dotted line 20, can thus be prepared in a single step. The dotted cutting edge 20 corresponds to a torch with five nozzles arranged in series as shown in FIGS. 5 to 7. If the torch had only three nozzles arranged in series or if a five-nozzle torch had two nozzles switched off, the cutting edge would correspond to line 21.

It is also possible to vary the position of the cutting edge by a corresponding swinging of the torch. The swing direction in this connection is designated by arrow 22.

What is claimed is:

1. A method for producing tulip shaped edges in a workpiece with a flame cutting torch consisting in directing a first stream of cutting oxygen against a surface of said workpiece, reducing the pressure of the cutting oxygen by more than 50 percent of that pressure required to cut completely through said workpiece, directing a second stream of a heating gas against said workpiece surface, said second stream surrounding said first stream unilaterally only at the part of said first stream which is directed against said workpiece to be cut.

2. A method as set forth in claim 1 wherein the second stream of heating gas includes oxygen in the mixture.

3. A method as set forth in claim 1 wherein the first and second streams are eccentrically arranged with respect to each other.

4. A method as set forth in claim 1 wherein the cutting oxygen is discharged through slots and the heating has is discharged through slots confined on the side of the nozzle disposed toward the work piece.

5. A method as set forth in claim 3 wherein a plurality of nozzles are inclined in series for simultaneous operation.

6. A method as set forth in claim 5 wherein the torch and its nozzles are rotated about an axis perpendicular to the work piece.

7. A method as set forth in claim 6 including switching off certain of the nozzles.

* * * * *